Nov. 24, 1959     R. H. KRESS     2,914,338
EQUALIZED VEHICLE FLUID SUSPENSION MEANS
Filed June 25, 1956     2 Sheets—Sheet 1
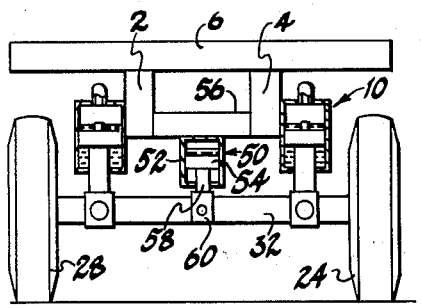
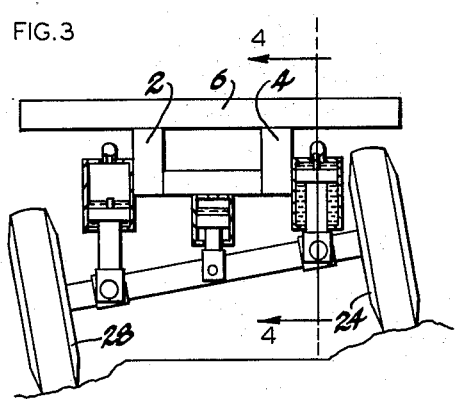
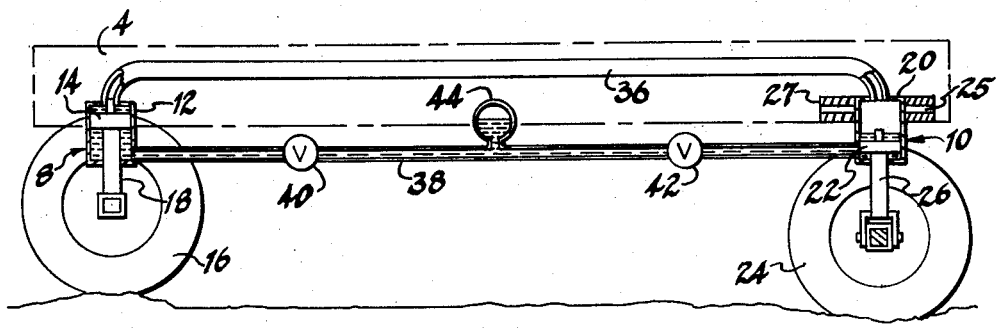
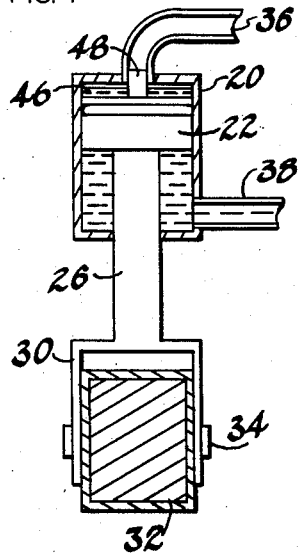
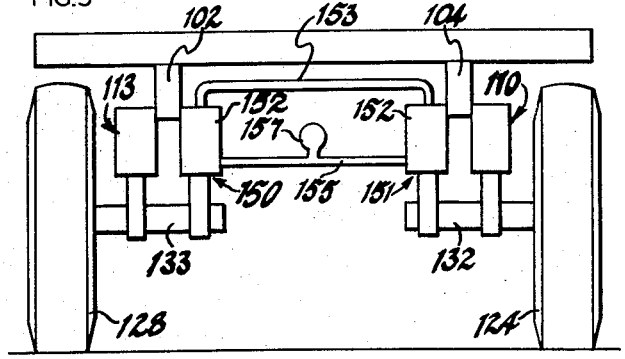
*INVENTOR.*
RALPH H. KRESS
BY *John F. Schmidt*
ATTORNEY Nov. 24, 1959  R. H. KRESS  2,914,338
EQUALIZED VEHICLE FLUID SUSPENSION MEANS
Filed June 25, 1956  2 Sheets-Sheet 2

INVENTOR.
RALPH H. KRESS
BY John F. Schmidt

ATTORNEY

United States Patent Office 2,914,338
Patented Nov. 24, 1959

2,914,338

EQUALIZED VEHICLE FLUID SUSPENSION MEANS

Ralph H. Kress, Kansas City, Mo.

Application June 25, 1956, Serial No. 593,478

7 Claims. (Cl. 280—104)

This invention relates to vehicle suspension means, and especially to suspension means employing one or more fluids with a plurality of expansible chamber devices.

Conventional vehicle suspension means in wide use today are of such a nature as to subject the vehicle frame, or frame and body assembly, to twisting forces when a wheel encounters an irregularity such as a bump or a hole. These twisting forces can do substantial damage to a vehicle which must negotiate rough terrain, as for example off-highway earthmoving vehicles.

It is therefore an object of this invention to provide suspension means for vehicle wheels which will avoid the severe twisting forces imposed by conventional suspension means, and will, at the same time, provide a softer spring effect (and better sway control or stability) than conventional means. This and other objects are accomplished in a wheel suspension means employing a double-acting expansible chamber device, with the devices of the wheels on each side being interconnected in such a way that the entire side of the vehicle, instead of just one corner, moves up and down.

In the drawings:

Fig. 1 is a longitudinal section through a vehicle embodying the invention, with parts broken away and in section to show details;

Fig. 2 is a rear end elevation, with parts broken away and in section;

Fig. 3 is a view similar to Fig. 2 but showing the parts in a different operating position;

Fig. 4 is a detailed sectional view through an expansible chamber device and its connection with a wheel, being a view in section on line 4—4 of Fig. 3;

Fig. 5 is a rear end elevation of another embodiment of the invention, showing the rear wheels independently suspended;

Figure 7:
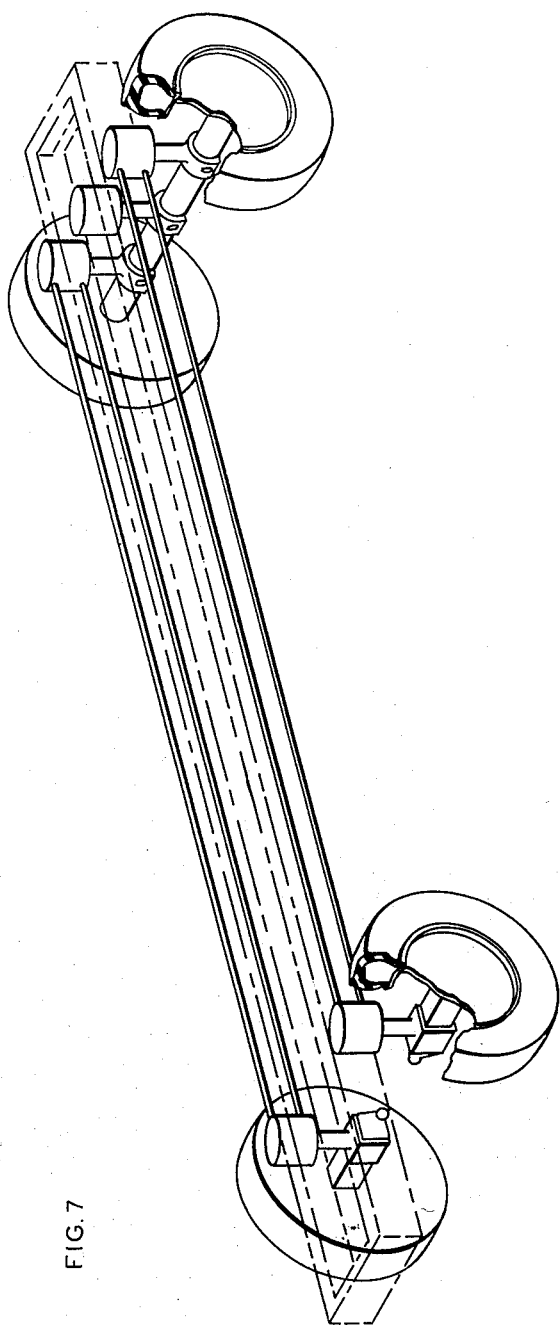
Fig. 7 is an isometric view of the embodiment shown in Fig. 6.

Referring now to the embodiment shown in Figs. 1–4, a vehicle is shown having a pair of frame members 2 and 4 supporting a suitable body 6. In order to simplify the drawing, only one of the frame members is shown in Fig. 1, and it is shown in phantom in that figure. Thus, the frame members 2 and 4 constitute a pair of laterally spaced supports for the body 6, as well as providing the framework which carries the vehicle wheels.

A pair of expansible chamber devices is associated with each support. Thus, the support 4 shown in Fig. 1 has a pair of fluid jacks indicated generally at 8 and 10 associated with it. Each jack or expansible chamber device comprises a cylinder member and a piston member, one of these members being secured to the support 4 and the other member carrying a ground engaging wheel. In the embodiment shown, the jack 8 consists of a cylinder member 12 secured in any suitable manner to the frame member 4, and a piston member 14 which carries a conventional vehicle wheel 16 by means of a piston rod 18.

In like manner, the expansible chamber device 10, at the other end of the vehicle, includes a cylinder member 20 suitably secured to the frame member 4 and a piston member 22 carrying a wheel 24 by means of a piston rod 26. In order to give the suspension means the necessary freedom of movement, the rear cylinders must be pivotal about longitudinal axes. Accordingly, cylinder 20 is provided with pins 25 which pivot in suitable bearings 27 provided on frame member 4.

Any of a number of conventional front end structures may be used, such as a knuckle steer solid axle with the usual alignment rods, a wagon-type king pin steer axle, and the like; alternatively, independent suspension of the front wheels may be used. In the embodiment shown, it may be assumed that the front wheels, one of which is shown at 16, are independently suspended. Details of the steering mechanism are not shown because they do not per se form a part of the invention. Also, in the embodiment shown, the rear wheels 24 and 28 are shown as being mounted on a solid axle. The use of a solid axle requires a pivotal connection of the piston rod with the axle in order to permit the type of motion indicated in Fig. 3. To this end, the lower end of piston rod 26 is provided with bifurcations 30 which pivotally engage the axle 32 by means of pins 34; see especially Fig. 4.

It will of course be understood by those skilled in the art that the frame member 2 also has a pair of jacks associated with it, although only one of these is shown in the drawings.

Each of the expansible chamber devices is charged at both ends with a fluid, which may be compressible or incompressible, or, as more commonly called, gas or liquid. Both ends may, and in some applications preferably will, carry the same fluid, or they may carry different fluids; in the embodiment shown, a compressible fluid or gas is provided above the piston and an incompressible fluid or liquid below the piston. (It will be understood that the term "gas" as here used in intended to include gaseous mixtures such as air.)

The gas spaces of the front and rear expansible chamber devices on one side are interconnected, in the embodiment shown by means of a conduit 36. Similarly, the liquid spaces of the front and rear jacks on one side are interconnected; in the embodiment shown, this connection consists of a conduit 38 in which there are provided variable orifices 40, 42 and a surge chamber 44. Although the interconnections 36 and 38 are illustrated in the embodiment between the front and rear expansible chamber devices 8 and 10 respectively on only the one side, it will be understood by those skilled in the art that the front and rear jacks or expansible chamber devices associated with the frame member 2 are similarly interconnected.

Reference will now be had briefly to Fig. 4. It will be noted that piston 22 preferably carries a small amount of lubricating oil 46 on its upper surface. Piston 22 is also preferably provided with a projection 48 substantially centered on its upper surface, projection 48 being adapted to engage a suitably located opening in the upper end of the cylinder with which conduit 36 is connected. By suitably tapering either the outlet opening in the cylinder end or projection 48, or both, a throttling effect can be obtained as piston 22 approaches the end of its travel.

In order to give fore-and-aft stability to a vehicle equipped with this invention, the vehicle is preferably provided at one or both ends with stabilizing means tending to equalize the levels of the front and back ends of the vehicle. Thus, in the embodiment shown in Figs.

1-4, and more particularly Figs. 2 and 3, a stabilizer jack 50 is shown, having a cylinder member 52 and a piston member 54. One of the members is secured to the frame and the other member to the axle. In the embodiment shown, the cylinder member 52 is secured in any suitable manner to the frame, as for example by a bracket 56 extending between frame members 2 and 4, while piston member 54 is connected with the axle by means of a piston rod 58 and suitable pivotal connecting means 60.

Referring now to Fig. 5 for another embodiment of the invention, in the vehicle there shown, the two rear wheels are independently suspended—i.e., the wheels are not mounted on a continuous axle; instead, each rear wheel is mounted independently of the other. This "independence" of the two rear wheels is modified to some extent by this invention, as will be understood from the description below.

In the embodiment shown in Fig. 5, rear wheels 124 and 128 are mounted on short axles 132 and 133. As in the case of the first embodiment, expansible chamber devices are provided to mount the wheels on the vehicle. Thus, expansible chamber device 110 corresponds to similar device 10 of Fig. 2, and serves to mount wheel 124. A corresponding expansible chamber device 113 on the left side serves to mount wheel 128.

Fig. 5 shows a modification of the stabilizing means shown as a single expansible chamber device 50 in Fig. 2. In Fig. 5, the stabilizing means takes the form of two expansible chamber devices 150 and 151 secured to frame members 102 and 104 respectively. In order that the two devices 150 and 151 may serve the same purpose as the single device 50 of the first embodiment, devices 150 and 151 are interconnected in much the same manner as devices 8 and 10 of the first embodiment. Thus, the gas spaces of cylinders 152 are interconnected by a conduit 153, and the liquid spaces are interconnected by a conduit 155 in which there is preferably provided a surge chamber 157.

Figure 6:
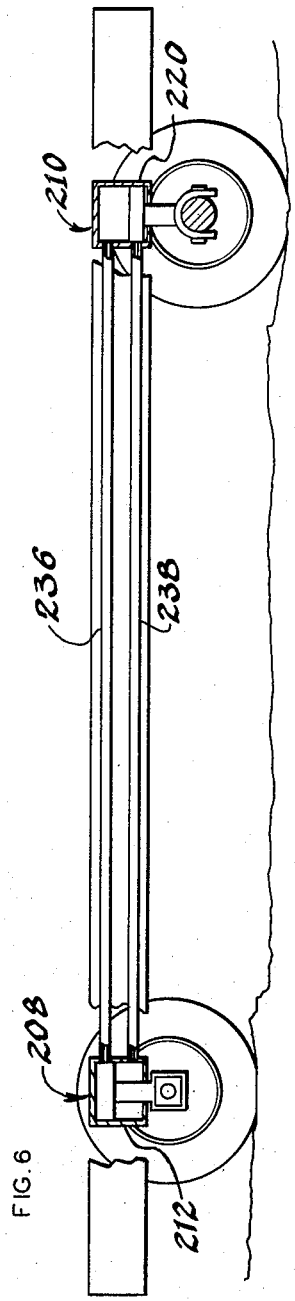
Fig. 6 is a view similar to Fig. 1 but showing another embodiment of the invention.

Reference is now made to Figs. 6 and 7 to show still another, and greatly simplified, embodiment of the invention. In this embodiment, both ends of the expansible chamber devices 208 and 210 are charged with the same fluid, in this case air under pressure, rather than with air and liquid as in the first two embodiments discussed above. The upper ends of cylinders 212 and 220 are interconnected by conduit means 236, and the lower ends of the cylinders are interconnected by conduit means 238. In the simplified embodiment shown, conduit means 238 is not provided with variable orifices, nor is there a surge chamber in it.

Operation

Reference will now be made to Fig. 1 for a brief description of the operation of suspension means made according to this invention. Let it be assumed that the right front wheel encounters an irregularity in the surface; in Fig. 1, the irregularity encountered by the front wheel is a "bump." As wheel 16 rides up on the bump in the road, piston 14 moves upward in its cylinder 12, increasing the pressure in the upper end of the cylinder. The pressure increase is communicated to the upper end of cylinder 20 by means of conduit 36. If wheel 24 is at this time still at the original road level, the resultant pressure increase will cause movement of cylinder 20 upward relative to piston 22. The effect of the substantially simultaneous pressure increase in both cylinders is a lifting of both ends of the frame substantially simultaneously; the effect on an observer riding on the vehicle is the same as it would be if the frame member 4 were lifted in the middle. At the same time that the pressure increase takes place in the upper ends of the cylinders, the upward movement of piston 14 reduces the pressure in the lower end of cylinder 12, causing liquid (oil) to flow from right to left as seen in Fig. 1. The provision of suitable orifices 40 and 42, along with the surge chamber 44 serves to cushion the rebound shock, as will be understood by those skilled in the art.

It will be seen from the foregoing that the interconnection of the two cylinders by means of conduit 36 results in a "softer" ride than would be possible without the interconnection, because the pressure increase resulting from the bump encountered by the front wheel is distributed over two expansible chamber devices instead of having to be absorbed by only one. Thus, a vehicle equipped with suspension means according to this invention tends to maintain a level position, provides a softer ride, and avoids subjecting the frame to the twisting forces present in conventional designs wherein all of the lift is at the wheel suspension point.

If rear wheel 24 encounters a hole at the same time that front wheel 16 rides up due to a bump, then of course the two motions compensate each other to the extent that the depth of the hole equals the height of the bump and, if these are equal, then there will be no rise of frame member 4. It should be noted however, that frame member 4 tends to remain level in a vehicle equipped with this invention, whereas a vehicle equipped with conventional suspension would experience a rise at the front end and a drop at the rear end, causing the well-known pitching motion inherent in vehicles equipped with conventional suspension means.

A suspension system embodying this invention desirably employs some stabilizing means tending to keep the front and back ends at the same level; in the absence of such means, any appreciable inequality in weight distribution will result in the vehicle settling to the extreme limits of travel of the cylinders at the heavy end. It is to prevent such a settling at one end that the embodiment of Figs. 1-4 is provided with the stabilizing means consisting of the expansible chamber device 50. The jack 50 provides sufficient resistance to keep either end of the vehicle from settling, and thus tends to keep the front and back ends "level," or at the same height above the plane of the road, so long as no irregularities in the road are encountered. At the same time, of course, the presence of the jack 50 also has a tendency to interfere with equal vertical motion of the two ends (on one side) when one wheel does encounter an irregularity. Even so, the tendency is not objectionable if the jack 50 is so designed as to be not too "stiff."

The embodiment shown in Fig. 5 differs from the first embodiment described in that the rear wheels are independently suspended. Accordingly, two expansible chamber devices 150 and 151 are employed in order to provide the stabilizer between the front and rear ends that is provided by one such device in the first embodiment. Interconnection of the cylinders 152 by the conduits 153 and 155 ties the two devices 150 and 151 together to give substantially the characteristics provided by the one device 50 in the first embodiment described. The interaction between the two devices operates on the same principle as the interaction between devices 8 and 10 of the first embodiment described, and need not be detailed here.

The principle of operation of the embodiment shown in Figs. 6 and 7 is substantially the same as the principle of operation of the first two embodiments discussed above. It will of course be understood that the simplified embodiment of Figs. 6 and 7 will not have all of the advantages of a system provided with the numerous refinements of the embodiments shown in Figs. 1-5.

It will be appreciated from the foregoing that this invention provides vehicle suspension means giving a softer and smoother ride while at the same time avoiding the twisting forces which are applied to frame and body structures of vehicles having conventional suspension means. Other advantages will be apparent to those skilled in the art.

I claim:

1. In a vehicle having a body and four wheels, an expansible chamber suspension device connecting each wheel to the body, each device having a partition movable in a chamber with a liquid on one side of the partition and a gas on the other side and connected to increase pressure in the liquid when the wheel moves downward relative to the body, means interconnecting said devices to effect substantially simultaneous movement in the same direction of both ends of the body on one side when either wheel on that side encounters an irregularity, and means connected with the wheels of at least one end of the vehicle and tending to equalize the levels of the front and back ends of the body.

2. A vehicle as in claim 1, in which the interconnecting means include conduit means to connect the gas end of a chamber with the gas end of another chamber, other conduit means to connect the liquid end of a chamber with the liquid end of another chamber, and surge control means in said other conduit means.

3. In a vehicle having a body and four wheels, an expansible chamber suspension device connecting each wheel to the body, each device having a partition movable in a chamber with a liquid on one side of the partition and a gas on the other side and connected to increase pressure in the liquid when the wheel moves downward relative to the body, means interconnecting said devices to effect substantially simultaneous movement in the same direction of both ends of the body on one side when either wheel on that side encounters an irregularity, and means, including additional expansible chamber means, connected with the wheels of at least one end of the vehicle and tending to equalize the levels of the front and back ends of the body.

4. A vehicle as in claim 3, in which the wheels at said at least one end are independently suspended, and wherein said additional expansible chamber means include an expansible chamber device for each wheel.

5. A vehicle as in claim 4, in which the devices of said additional expansible chamber means are interconnected.

6. In a vehicle having a body and four wheels, an expansible chamber suspension device connecting each wheel to the body, each device having a partition movable in a chamber with a liquid on one side of the partition and a gas on the other side, means to distribute the road shock of one wheel over two suspension devices including conduit means connecting suitable ports of two suspension devices, means on at least one of the partitions cooperating with one of said ports to throttle the flow of fluid as the partition approaches the port, and means connected with the wheels of at least one end of the vehicle and tending to equalize the levels of the front and back ends of the body.

7. In a vehicle having a body and four wheels, an expansible chamber suspension device connecting each wheel to the body, each device having a partition movable in a chamber with a liquid on one side of the partition and a gas on the other side, means to distribute the road shock of one wheel over two suspension devices including conduit means connecting suitable ports of two suspension devices, a projection on at least one of the partitions adapted to enter one of said ports to throttle the flow of fluid as the partition approaches the port, and means connected with the wheels of at least one end of the vehicle and tending to equalize the levels of the front and back ends of the body.

References Cited in the file of this patent

UNITED STATES PATENTS

| | | |
|---|---|---|
| 1,066,712 | Cooper | July 8, 1913 |
| 1,104,294 | Erickson | July 21, 1914 |
| 1,201,622 | Putnam | Oct. 17, 1916 |
| 1,776,279 | Beecher | Sept. 23, 1930 |
| 1,835,112 | Hawkins | Dec. 8, 1931 |
| 1,847,252 | Miller | Mar. 1, 1932 |
| 1,869,285 | Taber | July 26, 1932 |
| 2,154,463 | Littman | Apr. 18, 1939 |

FOREIGN PATENTS

| | | |
|---|---|---|
| 949,887 | France | Sept. 12, 1949 |
| 598,230 | Germany | June 7, 1934 |
| 363,811 | Great Britain | Dec. 31, 1931 |
| 601,731 | Great Britain | May 1, 1948 |